(12) United States Patent
Rode

(10) Patent No.: US 7,333,783 B2
(45) Date of Patent: Feb. 19, 2008

(54) MOBILE DEVICE WITH MANUALLY OPERATED POWER SOURCE

(75) Inventor: Jonathan P. Rode, Westlake Village, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 533 days.

(21) Appl. No.: 11/107,670

(22) Filed: Apr. 14, 2005

(65) Prior Publication Data

US 2006/0234669 A1 Oct. 19, 2006

(51) Int. Cl.
*H04B 1/04* (2006.01)

(52) U.S. Cl. .............. 455/127.1; 455/127.5; 455/414.1; 455/550.1

(58) Field of Classification Search ........... 455/127.1, 455/127.2, 127.3, 266, 141.1, 501, 403, 127.5, 455/414.1, 550.1
See application file for complete search history.

(56) References Cited

U.S. PATENT DOCUMENTS

| | | | | |
|---|---|---|---|---|
| 4,412,355 | A * | 10/1983 | Terbrack et al. | 398/111 |
| 6,056,889 | A | 5/2000 | Tsuda et al. | 252/62.52 |
| 6,768,230 | B2 | 7/2004 | Cheung et al. | 310/30 |
| 6,798,090 | B2 | 9/2004 | Cheung et al. | 310/17 |
| 6,809,427 | B2 | 10/2004 | Cheung et al. | 290/1 R |
| 6,812,583 | B2 | 11/2004 | Cheung et al. | 290/1 R |
| 6,812,598 | B2 | 11/2004 | Cheung et al. | 310/30 |
| 6,861,772 | B2 | 3/2005 | Cheung et al. | 310/30 |
| 6,901,066 | B1 * | 5/2005 | Helgeson | 370/348 |
| 2003/0224833 | A1 * | 12/2003 | Egan et al. | 455/572 |
| 2004/0251750 | A1 | 12/2004 | Cheung et al. | |
| 2006/0139000 | A1 | 6/2006 | Bailey et al. | |

FOREIGN PATENT DOCUMENTS

| WO | WO0024078 A | 4/2000 |
|---|---|---|
| WO | WO02103881 A2 | 12/2002 |

OTHER PUBLICATIONS

PCT Notification of Transmittal of the International Search Report and the Written Opinion of the International Searching Authority. Or the Declaration; Jan. 8, 2006, 6 pps.
PCT Written Opinion of the International Searching Authority: Jan. 8, 2006: 6 pps.

* cited by examiner

*Primary Examiner*—Tony T. Nguyen
(74) *Attorney, Agent, or Firm*—Koppel, Patrick, Heybl & Dawson

(57) ABSTRACT

A mobile device with a manually operated power source which generates power sufficient to operate the device when shaken by a user. A cable connected between the power source and mobile device carries the generated power from the power source to the mobile device such that the mobile device can be powered. The cable has a length sufficient to enable a user to hold the mobile device in one hand and the power source in the other hand such that the mobile device can be held stationary and used while the power source is simultaneously shaken. The mobile device and power source are preferably arranged such that they can be mechanically coupled together to form a single unit.

27 Claims, 2 Drawing Sheets

MOBILE DEVICE WITH MANUALLY OPERATED POWER SOURCE

BACKGROUND OF THE INVENTION

1. Field of the Invention

This invention relates to the field of mobile device power sources, and particularly to manually operated power sources for such devices.

2. Description of the Related Art

Mobile electrical and electronic devices such as cell phones, radios and flashlights, are typically powered by batteries, which may become discharged at inopportune times. Several approaches have been employed to overcome this problem. For example, some mobile devices are provided with a small integral generator which is operated with a crank or by being shaken. Prior to using the device, a user operates the crank or shakes the device; the resulting power charges a battery or other energy storage device, thereby allowing the device to be used for period of time. However, since power generation requires that the device be cranked or shaken, it is difficult or impossible to operate the device while generating the power, thereby necessitating that the power be generated prior to the device being used.

In addition to not being able to power and use the device simultaneously, this approach has additional drawbacks. More time and energy may be expended generating power than is necessary to ensure that the device does not run out while being used. Furthermore, the time delay inherent in this sequential approach may be annoying, and in some cases, involving emergency situations, dangerous.

SUMMARY OF THE INVENTION

A mobile device with manually operated power source is presented which overcomes the drawbacks noted above. Power can be generated while the device is in use, without disrupting usage of the device. The invention is also compatible and synergistic with power sources that harvest energy from unintended motion, thus allowing the desirable combination of continual low-level energy harvesting with intended energy generation when demand exceeds the harvested supply. The power created by shaking (purposeful motion) significantly exceeds the average power creation from energy harvesting (unintended motion).

The power source employed by the present system generates power when shaken by a user, and the mobile device is capable of being powered by the power so generated. Power generated by the source due to unintended motion is preferably stored and also available for use by the device. A cable is connected between the power source and mobile device which carries the generated power from the power source to the mobile device. The cable has a length sufficient to enable a user to hold the mobile device in one hand and the manually operated power source in the other hand such that the mobile device can be held stationary and used while the power source is simultaneously shaken.

The mobile device and manually operated power source are preferably arranged such that they can be mechanically coupled together to form a single unit. The cable is preferably a coiled cable which retracts into the single unit when the mobile device and power source are coupled together. The cable is preferably capable of being easily disconnected from the mobile device, so that it could be interchangeably employed with a variety of other mobile devices, including cell phones, personal digital assistants (PDAs), global positioning system (GPS) devices, handheld game players, MP3 players, cameras, radios, flashlights, etc. As a single unit the device has all the advantages of current single unit devices, including the ability to harvest energy from unintended motion.

Further features and advantages of the invention will be apparent to those skilled in the art from the following detailed description, taken together with the accompanying drawings.

BRIEF DESCRIPTION OF THE DRAWINGS

FIG. 1b is an alternative configuration for the mobile device with manually operated power source shown in FIG. 1a.

DETAILED DESCRIPTION OF THE INVENTION

Figure 1A:
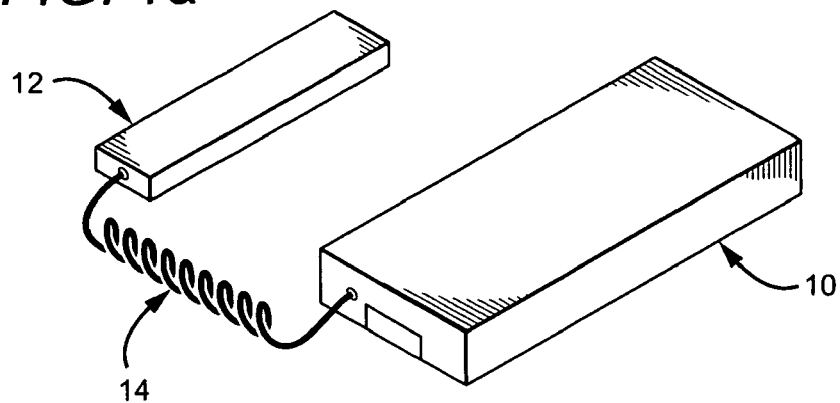
FIG. 1a is a diagram illustrating the basic principles of the present mobile device with manually operated power source.

The principles of a mobile device with a manually operated power source in accordance with the present invention are illustrated in FIG. 1a. A minimum of three components are required: a mobile electronic device 10, a manually operated power source 12, and a cable 14 which carries power generated by power source 12 to mobile device 10.

As illustrated in FIG. 1a, power source 12 is manually operated; as used herein, "manually operated" means that power source 12 is arranged to generate power when shaken by a user; some power sources, including those preferred for the present application, may also generate power as a result of unintended motion. Mobile device 10 is capable of being powered by the power generated by power source 12 when it is shaken. The cable 14 connected between power source 12 and mobile device 10 must have a length sufficient to enable a user to hold the mobile device in one hand and the power source in the other hand, such that the mobile device can be held stationary and used while the power source is simultaneously shaken. By physically separating the power source and mobile device as described herein, the mobile device may be used at the same time that power is being generated. This solution enables power to be generated without disrupting the user, and eliminates the power generation delay inherent in prior art approaches.

Mobile device 10 may be any of a variety of portable electronic devices, including cell phones, PDAs, GPS devices, handheld game players, MP3 players, cameras, radios, flashlights, etc. For convenience, cable 14 is preferably a retractable coiled cable.

Figure 1B:
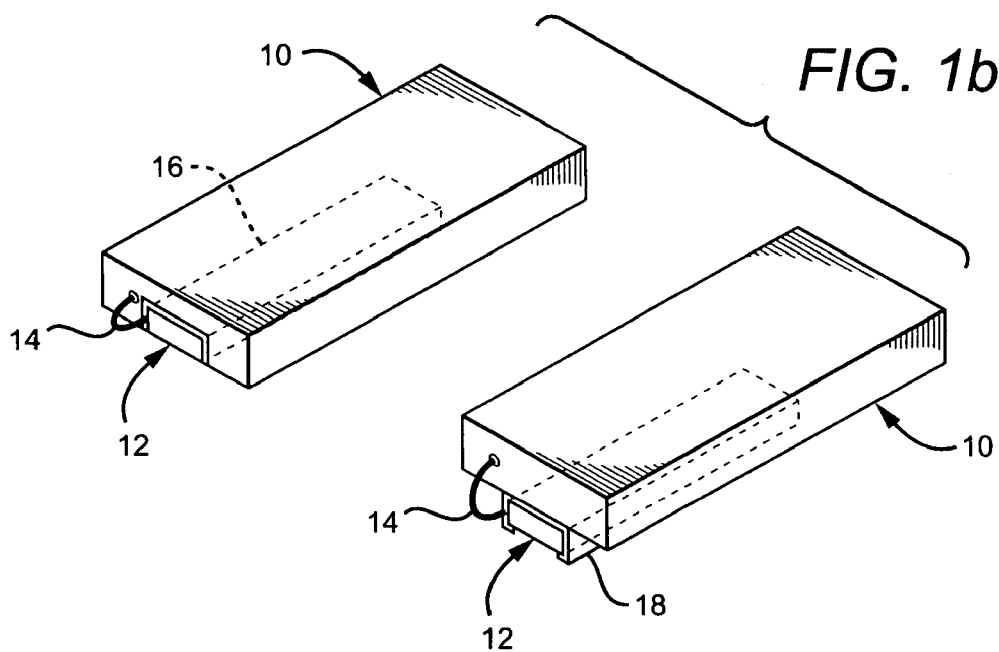

The present mobile device and manually operated power source are preferably arranged such that they can be mechanically coupled together to form a single unit. This is illustrated in FIG. 1b. A means is preferably provided whereby power source 12 can be inserted into or attached to mobile device 10, and such that cable 14 can be retracted into the combined unit and largely hidden. This enables the combined unit to be easily carried and transported. With the appropriate charging unit, this also allows the combined unit to function in an energy harvesting mode, slowly charging a battery or other energy storage device from unintended movement of the combined unit, such as when clipped to the user's belt. Then, to use in a rapid charge mode if needed, power source 12 is separated from mobile device 10, so that it can be shaken while device 10 is being used.

There are many ways in which the mobile device and manually operated power source could be mechanically coupled. The exemplary embodiment shown in FIGS. 1a and 1b employs a recessed area 16 within mobile device 10 which is designed to accommodate power source 12 and cable 14. Many alternative arrangements are possible, such as the use of guide rails 18 on one surface of the mobile device, into which power source 12 can slide and be held (illustrated in FIG. 1c).

Figure 2:
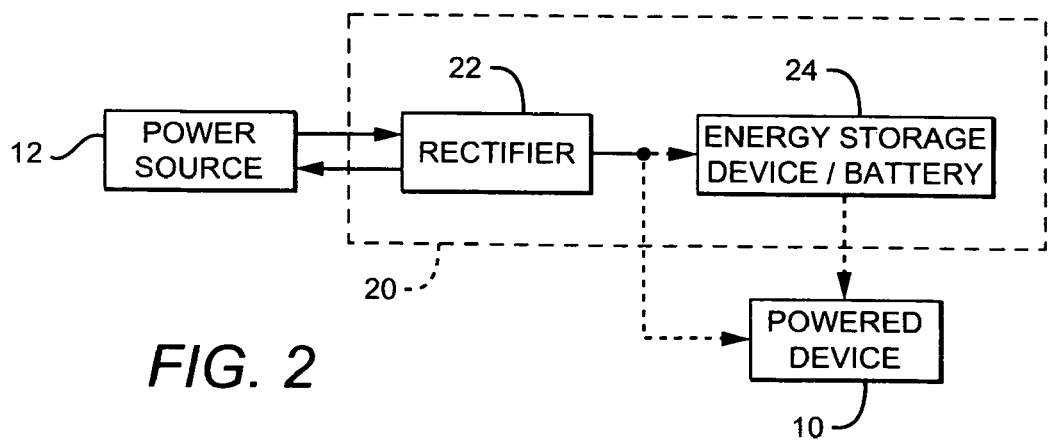
FIG. 2 is a block diagram illustrating electrical connections between the mobile device and the manually operated power source.

As illustrated in FIG. 2, some sort of interface circuitry 20 which performs power conditioning would typically be required between power source 10 and mobile device 12. For example, most mobile devices operate from a DC voltage. If the output of power source 12 is an alternating current, a rectifier circuit 22 would be needed to provide a DC current suitable for use by mobile device 10.

The present system may include an energy storage system 24, though this is not essential, and may be eliminated to save weight and space. Energy storage system 24 might be, for example, a battery or a capacitor. Power generated by power source 12 would be stored on energy storage system 24. The use of an energy storage system 24 provides several advantages: for example, it would allow mobile device 10 to be used for a period of time without power source 12 being shaken, it can be used to store harvested energy if the unit is so equipped, and could act to improve the quality of the power provided to mobile device 10. When an energy storage system as described above is not employed, manually operated power source 12 must be capable of providing the power needs of the mobile device while being shaken by the user.

Any sort of power source which generates power by being shaken by a user could be employed, as long as it generates enough power to operate the mobile device to which it is connected. A preferred power source of this sort employs a magnet, a conductive coil, and a low-friction ferrofluidic bearing, arranged such that the magnet and coil move with respect to each other when the power source is shaken such that an electrical current I is produced in the coil. This concept exploits the harvesting of energy generated due to unintended motion, as well as providing the capability to rapidly produce large amounts of power when and if needed.

Figure 3:
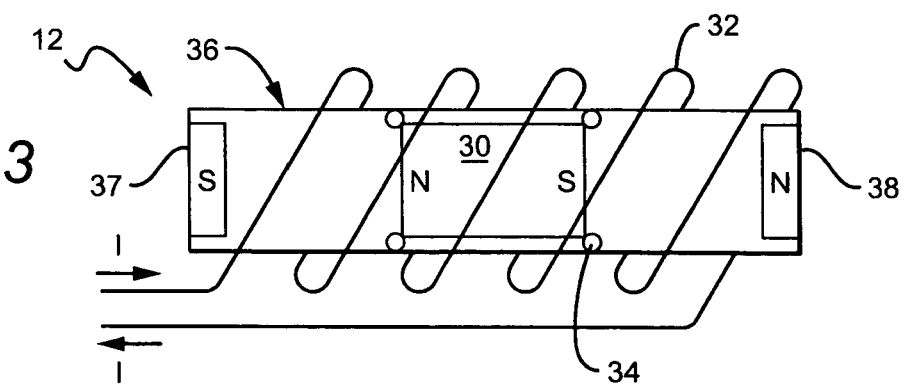
FIG. 3 is one possible embodiment of a manually operated power source as might be used with the present invention.

One possible embodiment of this type of power source is shown in FIG. 3. A magnet 30 and a ferrofluidic bearing 34 are enclosed within a nonmagnetic closed tube 36, and a conductive coil 32 wraps around the exterior of the tube such that magnet 30 moves with respect to coil 32 as it moves within tube 36. A linear tube 36 is shown; however, alternative tube shapes might also be used, including circular or box-shaped tubes, for example. A ferrofluid introduced into tube 36 is naturally attracted to the poles of magnet 30 to form beads 34 around the end poles of the magnet. This provides an ultra low friction lubricant that allows magnet 30 to freely move within tube 36, which provides a supporting structure for the magnet. When tube 36 is shaken, magnet 30 moves back and forth with respect to fixed coil 32 to produce an alternative current I in the coil. Current I can be used to power a load such as a mobile device directly; however, in most applications, the energy produced by the power source requires conditioning by interface circuitry such as a rectifier circuit (as described above), before it can be used by the mobile device or stored.

The power source in FIG. 3 might optionally include recoil end magnets 37 and 38 affixed at opposite ends of tube 36, with the polarities of the end magnets selected to repel sliding magnet 30 when it comes into close proximity with the end magnets. Also note that instead of a single magnet 30, the power source might include two or more magnets (not shown), each of which is supported by respective ferrofluidic bearings, with the magnets arranged within the tube such that each is separated from its adjacent magnets by a gap maintained by magnetic repulsion—such that the magnets slide between the opposite ends of tube 36 when the power source is being shaken. Additional details concerning these types of power sources can be found in U.S. Pat. Nos. 6,812,598, 6,768,230, 6,809,427, 6,861,772, 6,798,090 and 6,812,583, and co-pending patent applications Ser. Nos. 10/756,990, 10/846,418 and 10/932,215, all of which are assigned to the present assignee. A summary of patents related to the preparation of ferrofluids is provided in U.S. Pat. No. 6,056,889.

Figure 4:
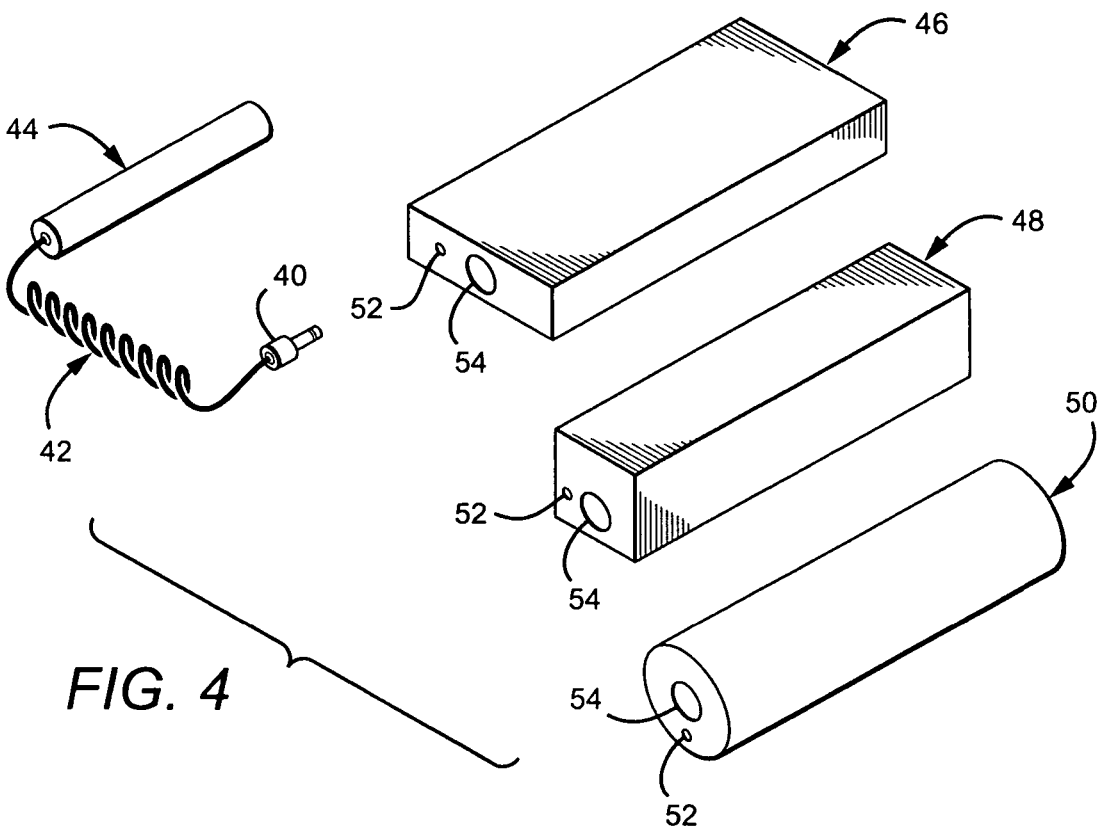
FIG. 4 is a diagram illustrating how a manually operated power source per the present invention could be interchangeably employed with a variety of mobile devices.

The present invention is preferably configured such that the power source can be interchangeably employed with a variety of mobile devices. This is illustrated in FIG. 4. One way in which this can be accomplished is by adding a plug 40 onto the mobile device-end of cable 42. Each of the mobile devices (46, 48, 50) intended for use with power source 44 is provided with a jack 52 which mates with plug 40. When so arranged, power source 44 may be used with one mobile device, then unplugged and used with another mobile device, as needed.

As described above, each mobile device intended for use with power source 44 preferably includes a means whereby the power source may be mechanically coupled to the device. Here, power source 44 has a cylindrical shape. To enable the mechanical coupling of the two components, each mobile device includes a cylindrical recess 54 sized to accommodate power source 44, and preferably cable 42 as well.

Figure 5:
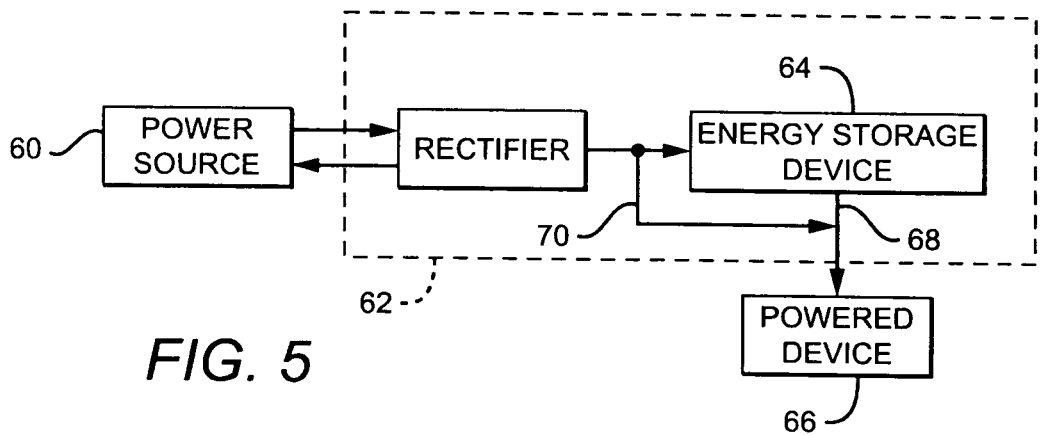
FIG. 5 is a block diagram illustrating electrical connections between the mobile device and the manually operated power source as might be realized when the mobile device and manually operated power source are mechanically coupled together.

As noted above, a power source as described herein can generate power when shaken, and from unintended motion of the mobile device when configured as a combined unit. When combined with an energy storage means to store the power generated from unintended motion, power may be supplied to the mobile device either by shaking (purposeful motion), and/or from the stored energy. This arrangement is illustrated in FIG. 5. A power source 60 as described herein is connected to interface circuitry 62. The interface circuity includes an energy storage device 64 such as a battery or capacitor, to store power generated from unintended motion. A mobile device 66 may then be powered from the stored energy (68), and/or directly from the power source (70).

While particular embodiments of the invention have been shown and described, numerous variations and alternate embodiments will occur to those skilled in the art. Accordingly, it is intended that the invention be limited only in terms of the appended claims.

I claim:

1. A mobile device with manually operated power source, comprising:

a manually operated power source which generates power when shaken by a user;

a mobile device; and a cable connected between said power source and said mobile device which carries said generated power from said power source to said mobile device to power said mobile device, said mobile device capable of being powered by the power generated by said power source when said power source is shaken, said cable having a length sufficient to enable a user to hold said mobile device in one hand and said power source in the other hand such that said mobile device can be held stationary and used while said power source is simultaneously shaken.

2. The mobile device with manually operated power source of claim 1, wherein said manually operated power source comprises:
   a conductive coil;
   a magnet;
   a low-friction ferrofluidic bearing in contact with and supporting one of said coil or magnet;
   said coil, magnet and bearing arranged such that said magnet and said coil move with respect to each other when said power source is in motion such that an electrical current is produced in said coil.

3. The power source of claim 2, wherein said manually operated power source further comprises a closed nonmagnetic tube, said coil affixed to the exterior of said tube, said magnet and bearing enclosed within said tube such that said magnet is in contact with and supported by said bearing and is free to move within said tube such that said magnet and said coil move with respect to each other when said power source is in motion such that an electrical current is produced in said coil.

4. The power source of claim 3, wherein said power source comprises two or more of said magnets, each of which is supported by respective ferrofluidic bearings, said magnets arranged within said tube such that each magnet is separated from its adjacent magnets by a gap maintained by magnetic repulsion.

5. The power source of claim 3, wherein said closed nonmagnetic tube is a circular tube.

6. The power source of claim 3, wherein said closed nonmagnetic tube is a box-shaped tube.

7. The power source of claim 3, wherein said closed nonmagnetic tube is a linear tube and said magnet slides between the opposite ends of said tube when said power source is in motion.

8. The power source of claim 7, further comprising recoil end magnets affixed at opposite ends of said closed nonmagnetic linear tube, the polarities of said end magnets selected to repel said sliding magnet when it comes into close proximity with said end magnets.

9. The power source of claim 7, wherein said power source comprises two or more of said magnets, each of which is supported by respective ferrofluidic bearings, said magnets arranged within said tube such that each magnet is separated from its adjacent magnets by a gap maintained by magnetic repulsion and such that said magnets slide between the opposite ends of said tube when said power source is in motion.

10. The power source of claim 9, further comprising recoil end magnets affixed at opposite ends of said closed tube, the polarities of said end magnets selected to repel the sliding magnet adjacent to said end magnet when said sliding magnet comes into close proximity with said end magnets.

11. The mobile device with manually operated power source of claim 1, wherein said cable is a coiled cable.

12. The mobile device with manually operated power source of claim 1, further comprising a means by which said mobile device and said manually operated power source can be mechanically coupled together to form a single unit.

13. The mobile device with manually operated power source of claim 12, wherein said cable is a coiled cable which substantially retracts into said single unit when said mobile device and said manually operated power source are mechanically coupled together.

14. The mobile device with manually operated power source of claim 12, wherein said means comprises a recessed area within said mobile device having a size sufficient to accommodate said power source.

15. The mobile device with manually operated power source of claim 12, wherein said means comprises guide rails on an exterior surface of said mobile device arranged to accommodate said power source.

16. The mobile device with manually operated power source of claim 1, further comprising an energy storage system connected to receive and store said generated power and to make said stored power available for powering said mobile device.

17. The mobile device with manually operated power source of claim 16, wherein said energy storage system comprises a battery.

18. The mobile device with manually operated power source of claim 16, wherein said energy storage system comprises a capacitor.

19. The mobile device with manually operated power source of claim 16, wherein said manually operated power source produces an alternating current, said energy storage system further comprising an interface circuit which receives and rectifies said alternating current.

20. The mobile device with manually operated power source of claim 16, wherein said power source is further arranged to generate power from unintended motion, said power stored in said energy storage system and made available for powering said mobile device.

21. The mobile device with manually operated power source of claim 20, further comprising a means by which said mobile device and said manually operated power source can be mechanically coupled together to form a single unit, said power source capable of generating power from unintended motion that occurs while said mobile device and said manually operated power source are coupled together.

22. The mobile device with manually operated power source of claim 1, wherein said mobile device includes a jack and said cable is terminated with a plug that mates with said jack such that said cable is connected to said mobile device by inserting said plug into said jack.

23. A mobile device with manually operated power source, comprising:
   a manually operated power source which generates power when shaken by a user or due to unintended motion of said power source;
   a mobile device, said mobile device including a means by which said manually operated power source and said mobile device can be mechanically coupled together to form a single unit;
   an energy storage system connected to receive and store said power generated due to unintended motion when said mobile device and said manually operated power source are coupled together and to make said stored power available for powering said mobile device; and
   a cable connected between said power source and said mobile device which carries said generated power from said power source to said mobile device to power said mobile device, said mobile device capable of being powered by the power generated by said power source when said power source is shaken or by power stored in said energy storage system, said cable having a length sufficient to enable a user to hold said mobile device in one hand and said power source in the other hand such that said mobile device can be held stationary and used while said power source is simultaneously shaken.

24. A mobile device with manually operated power source, comprising:

a manually operated power source which generates power when shaken by a user, said power source comprising:

a conductive coil;

a magnet;

a low-friction ferrofluidic bearing in contact with and supporting one of said coil or magnet;

said coil, magnet and bearing arranged such that said magnet and said coil move with respect to each other when said power source is in motion such that an alternating current is produced in said coil;

an interface circuit which receives and rectifies said alternating current;

a mobile device, said mobile device including a means by which said manually operated power source and said mobile device can be mechanically coupled together to form a single unit; and a cable connected between said power source and said mobile device which carries said generated power from said power source to said mobile device to power said mobile device, said mobile device capable of being powered by said rectified current when said power source is sufficiently shaken, said cable having a length sufficient to enable a user to hold said mobile device in one hand and said manually operated power source in the other hand such that said mobile device can be held stationary and used while said power source is simultaneously shaken.

25. The mobile device with manually operated power source of claim 24, wherein said cable is a coiled cable which substantially retracts into said single unit when said mobile device and said manually operated power source are mechanically coupled together.

26. The mobile device with manually operated power source of claim 24, further comprising an energy storage system connected to receive and store said rectified current and to make said stored power available for powering said mobile device.

27. The mobile device with manually operated power source of claim 24, wherein said power source is further arranged to generate power as a result of unintended motion that occurs while said mobile device and said manually operated power source are mechanically coupled together to form a single unit, said power generated as a result of unintended motion stored in said energy storage system and made available for powering said mobile device.

* * * * *